United States Patent [19]
Finni

[11] Patent Number: 5,941,978
[45] Date of Patent: Aug. 24, 1999

[54] METHOD FOR COMPARING ATTRIBUTE VALUES OF CONTROLLABLE OBJECT EXPRESSIONS IN A NETWORK ELEMENT

[75] Inventor: Olli Finni, Helsinki, Finland

[73] Assignee: Nokia Telecommunication Oy, Espoo, Finland

[21] Appl. No.: 08/860,560

[22] PCT Filed: Dec. 29, 1995

[86] PCT No.: PCT/FI95/00719

§ 371 Date: Jun. 30, 1997

§ 102(e) Date: Jun. 30, 1997

[87] PCT Pub. No.: WO96/21324

PCT Pub. Date: Jul. 11, 1996

[30] Foreign Application Priority Data

Dec. 30, 1994 [FI] Finland ................................. 946209

[51] Int. Cl.$^6$ ................................................. G06F 15/173
[52] U.S. Cl. ............................... 712/28; 709/201; 710/42
[58] Field of Search .............................. 395/800.28, 824, 395/826, 862, 200.31; 712/28; 710/4, 6, 42; 709/201

[56] References Cited

U.S. PATENT DOCUMENTS

| | | | |
|---|---|---|---|
| 4,737,983 | 4/1988 | Frauenthal | 379/221 |
| 5,261,080 | 11/1993 | Khoyi et al. | 395/500 |
| 5,361,351 | 11/1994 | Lenkov et al. | 395/700 |
| 5,412,756 | 5/1995 | Bauman | 395/50 |
| 5,768,360 | 6/1998 | Reynolds | 379/220 |
| 5,790,789 | 8/1998 | Suarez | 395/200.32 |
| 5,835,087 | 11/1998 | Herz | 345/327 |

FOREIGN PATENT DOCUMENTS 661 628  7/1995  European Pat. Off. .

OTHER PUBLICATIONS

"Common Management Information Protocol Specification for CCITT Applications", CCITT Recommendation X.711, 1991.

*Primary Examiner*—Eric Coleman
*Attorney, Agent, or Firm*—Pillsbury Madison & Sutro LLP

[57] ABSTRACT

A method for selecting a target group for an operation applied to a network element (NE) of a communication network includes (a) receiving from a network management element information on the operation and on the first target group (S), which is a group of object instances contained in the memory of the network element, and as comparison criteria of object instance attributes, the criteria containing the reference values, (b) comparing the attribute values of object instances belonging to the first target group to said reference values, and (c) selecting the final target group from among those object instances in the first target group (S) that have attributes fulfilling the received comparison criteria. To achieve a general-purpose method, a comparison between the attributes of a single object instance is carried out by (i) reading a semantic data which has been prestored in the network element memory, and which is associated with the attribute, (ii) searching the associated attribute value of the object instance from the network element, and (iii) comparing the attribute value to the received reference value by utilizing the semantic data read.

3 Claims, 3 Drawing Sheets

METHOD FOR COMPARING ATTRIBUTE VALUES OF CONTROLLABLE OBJECT EXPRESSIONS IN A NETWORK ELEMENT

This application is the national phase of international application PCT/FI95/00719 filed Dec. 29, 1995 which designated the U.S.

FIELD OF THE INVENTION

The present invention in general relates to management systems of communication networks. More specifically, a method for selecting a target group for an operation applied to a network element of a communication network is provided.

BACKGROUND OF THE INVENTION

The network management system of the present invention may in practice, be of the type illustrated in FIG. 1. Network operators, who are positioned at operation centers OC, use network management workstations WS, which are connected to a separate workstation network WSN, such as, for example, an Ethernet network. Typically, the management system is distributed in several computers of the workstation network, and have an access to a database DB, which includes the information required for the management of the network. Via a Q3 interface determined in international standards, the management system is connected, for instance, to a mobile network MN, which may comprise as network elements NE a mobile services switching center MSC, a base station controller BSC, a base station BTS, and a mobile station. The connection to the managed network is established by a data communication network DCN. The managed network may also be any communication network, for example, a combined SDH/PDH network.

A CMISE application service element (CMISE=Common Management Information Service Element), used in OSI communication of Q3 interface in network management, provides the application process with a SCOPE/FILTER function (cf., ISO/IEC-9596-1 Information Technology— Open Systems Interconnection—Common management information protocol—Part 1:Specification). The purpose of the function is to select a sub-group from among the managed object instances, to which a CMIP operation (CMIP=Common Management Information Protocol), such as a m-Get, is applied.

The managed objects in the network element form a tree-like hierarchical structure, which is stored in the memory of the network element, and whose nodes contain the object instance and attributes relating thereto. In SCOPE/FILTER function, the SCOPE condition is used for demarcating the CMIP operation to refer to a subtree in the tree (MIT, Managed Information Tree) of the managed object instances. This takes place by the name, i.e., DN (Distinguished Name), of the subtree root being given in the operation. The FILTER condition of the CMIP operation is applied separately to each object instance functioning as a node for the subtree. The values of the object instance attributes must fulfil this condition prior to applying the CMIP operation to the object instance. Following application of SCOPE and FILTER conditions, the group of those object instances to which the CMIP operation relates has been established.

In testing whether the values of the object instances meet the FILTER condition, a comparison is carried out in which the attribute values of the object instances are compared to specific reference values. Without a general-purpose testing mechanism, a separate, specific comparison function needs to be created for each type of attribute in the network element. To carry out this, the network element must have a large memory capacity. As far as large network elements are concerned, typically having hundreds or even thousands of managed objects, complicates and slows memory management because the overall memory capacity required to carry out the comparison increases tremendously. For small network elements, a memory requirement such as this is also emphasized in an economical sense because in a strive to implement small network elements (for example, mobile phones) as economically as possible, memory expansion of just one byte bears significance.

For the above reasons, in the implementation of the FILTER condition, a general purpose solution should be the goal, i.e., how to implement the testing of the FILTER condition in a network element by in general purpose manner. The object is to implement a function which is able to determine, based on the FILTER condition of the CMIP operation and the attribute values of the object instance, whether the attribute values of the object instance fulfil the FILTER condition. The form of the FILTER condition is disclosed in the aforementioned standard, ISO/IEC-9596-1 p. 16, by of ASN.1 notation in an ASN.1 data type CMIS-Filter (ASN.1=Abstract Syntax Notation One). The ASN.1 notation is determined in the standard ISO 8824 and described in more detail. In practice, the FILTER condition is a regular expression (c.f., expressions in a programming language), which may contain logical operators (AND, OR, NOT), relational operators (=, $\leq$, $\geq$), graphic string operators (initialString, anyString, finalString), and set operators (present, subsetOf, supersetOf, non-nullIntersection).

The logical operators and the graphic string operators present no problem in testing a general-purpose FILTER condition. Instead, a problem arises concerning the implementation of relational operators and set operators. The difficulties in the implementation of the operators are clearly shown in the following example:

The attribute under comparison is assumed to be of type A, represented in ASN.1 notation as follows:

```
A::=SEQUENCE {
    B INTEGER,
    C REAL,
    D GraphicString
}
```

The aforementioned denotation means that an attribute of type A is a sequence of three variables, B, C, and D, in which B is an integer, C is a real number and D is a graphic string. In the network element, the type A can be implemented as the following struct data type of C language:

```
typedef struct {
    int     B;
    float   C;
    char    *D;
} A;
```

If the comparison function of the attribute values obtains the real value of the attribute and the reference value as a mere octet string, without knowing the structure of the data type in closer detail, it is hard to conceive how to carry out a general-purpose equivalence comparison between the attribute values. Even if two values of the type A had exactly the same meaning, a linear octet string comparison results in an erroneous result if the graphic string pointers of the field D point to different locations. The equivalence comparison only gives a correct result if the comparison function knows that "the data type A is a record whose third field (D) is a pointer to a graphic string, and that the equivalence comparison of the third field takes place between graphic strings addressed by the pointers".

Therefore, a problem in testing the FILTER condition stems from the fact that it is not possible to apply a linear octet string comparison to the attribute values contained in the FILTER condition, but the comparer must always, by one way or another, be aware of the data types of the attribute values under comparison.

SUMMARY OF THE INVENTION

It is an object of the present invention to provide a method which avoids the problem in testing the FILTER condition according to. This object is achieved by a method according to in which a comparison between the attributes of a single object instance is carried out by (a) reading a semantic data which has been prestored in the network element memory, and which is associated with the attribute, (b) searching the associated attribute value of the object instance from the network element, and (c) comparing the attribute value to the received reference value by utilizing the semantic data read.

The invention stores, in the memory of the network element (already at the commissioning stage, for example), the semantic data indicating the data type to be employed in comparing an attribute of a specific object instance. When the network element is used, and the network management system (operator) is searching for a target group for a CMIP management operation to be applied to the network element, this semantic data is first read at the network element, and then used to compare the attribute values of the object instance to the reference values received from the network management system.

The result assumes that the data types in accordance with the description language used (e.g., ASN.1) are created into data types of such a programming language for which there exists a translator (for-example, C or C++ compiler). This takes place in the network element on the basis of unequivocal rules. In the above, an example is shown of ASN.1 data type and a data type in C language derived from the ASN.1 data type. The instances of data types (in C language, for example) derived from the ASN.1 representations are here referred to as home areas. In the network element, the attribute values are thus represented as home areas.

The invention is based on the realization that attribute values can be compared, if the semantic of home areas corresponding to them is known in the network element when the CMIP management operation is being carried out.

The invention uses a considerably smaller memory and improves memory management in the network element. Although it is necessary to store a separate semantic data for each type of attribute in the network element, the significant point is that the semantic data can be stored in a considerably smaller memory space than comparison functions, which are required if no general-purpose comparison mechanism according to the invention is available.

BRIEF DESCRIPTION OF THE DRAWINGS

In the following, the invention and the preferred embodiments relating thereto will be disclosed in detail with reference to the attached drawings, in which.

DETAILED DESCRIPTION OF THE CURRENTLY PREFERRED EMBODIMENT

When a management operation is applied to a network element in a communication network for which a final target group must be found, the network management system sends, in accordance with the CMIP data transfer protocol, information to the network element on the operation and the target group. The target group is indicated as a group of object instances (i.e., a subtree, whose root node identifier is sent to the network element) and as comparison criteria of object instance attributes, which criteria contain one or more reference values and one or more comparison conditions. Following this, the attribute values of object instances belonging to the target group are compared in the network element to the received reference values by utilizing the received comparison conditions, and the final target group is selected from among those object instances in the original target group that have attributes fulfilling the received comparison criteria.

Figure 2:
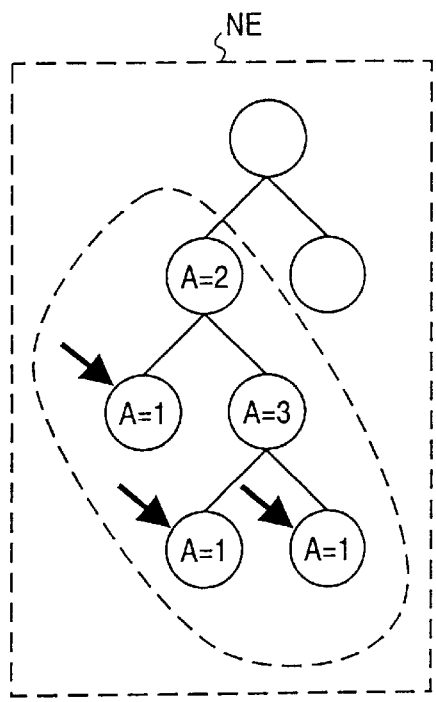
FIG. 2 shows a tree formed by managed object instances.

FIG. 2 shows a tree of managed object instances, i.e., an MIT, and a group of object instances demarcated therefrom by SCOPE and FILTER conditions. The group of object instances (e.g., a subtree) demarcated by the SCOPE condition is within the broken line S. An arrow indicates the object instances demarcated by the FILTER condition "attribute A has the value 1". Thus, in the example of FIG. 2, the final target group of the CMIP operation is the object instances indicated by the arrow.

A more detailed description of how the comparison is carried out in the network element on the basis of information received from the network management system is provided.

To achieve a general purpose compare mechanism, the instances of data types, i.e., the home area semantic, is illustrated in the network element as a tree-like data structure, which may have nodes at several layers. Each node indicates the data type to be employed in comparing the attribute of the object instance. The tree-like data structure corresponds to a parsing tree that the translator (e.g., C compiler) of the programming language used has produced out of the data type of the home area. It is advantageous to produce the semantic tree of the home area at the same time as the ASN.1 data type is being produced into data types of the programming language to be used in the network element. Typically, at this stage, a compiler program is used, which translates the ASN.1 representation into data types of the programming language.

Figure 3:
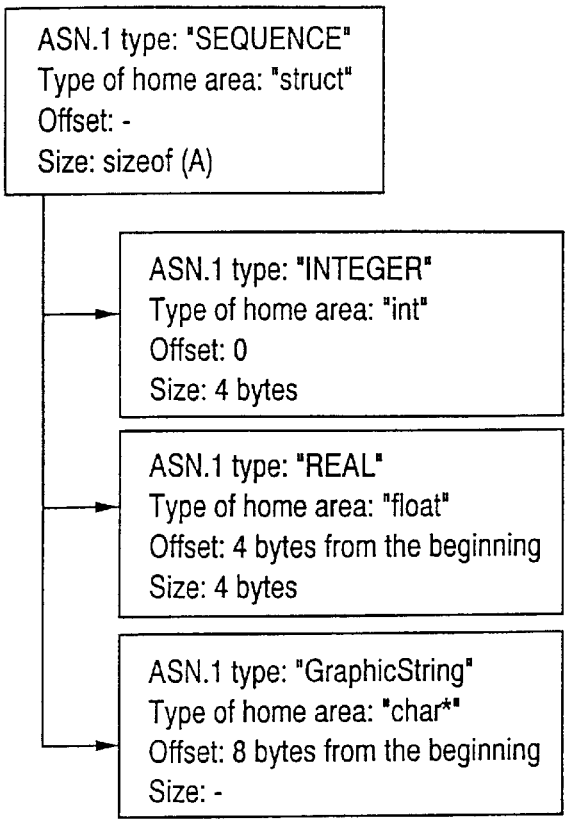
FIG. 3 shows a semantic tree corresponding to data type A in C language.

A semantic tree shown in FIG. 3 corresponds to the C language version of the type A in the above example. By the semantic tree, the structure of the home area in the memory is known in detail. The semantic tree of the home area of the data type A indicates that the home area belongs to "struct" type of C language, and has two separate memory areas. The first memory area contains, in sequence, a four-byte-long integer (ASN.1 type INTEGER, C language type "int"), a four-byte-long floating point number (ASN.1 type REAL, C language type "float"), and the initial address of the second memory area (ASN.1 type GraphicString, C language type "char *", i.e. graphic string pointer). The second memory area contains the graphic string. Accordingly, by the semantic tree, it is known that "the equivalence comparison of the third field D of type A home areas takes place between graphic strings that are addressed by pointers positioned eight bytes from the beginning of the home areas". Correspondingly, the information contained in the semantic tree is utilized when comparing the first and the second fields of the home areas. Thus, by the semantic tree, it is possible to carry out a comparison between two attribute values of the type A as a comparison of the home areas corresponding to the attribute values.

Figure 4:
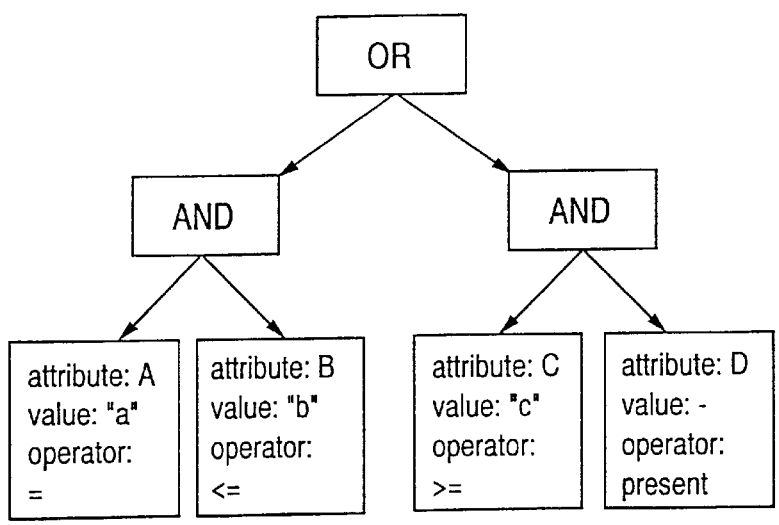
FIG. 4 shows an example of a tree-like data structure corresponding to FILTER condition.

It is assumed that the FILTER condition of a CMIP operation (e.g., m-Get) is represented in the network element (such as the Nokia DX200 switching exchange) as a tree-like data structure whose leaf nodes include the Object Identifier of the attribute under comparison, the home area of the reference value and the operator. As the operator, there are the relational operator ($\leq$, $\geq$, =), the graphic string operator (initialString, anyString or finalString), or a string of set operators (present, subsetOf, supersetOf or nonNullIntersection). In the other nodes of the tree, there may be logical operators (AND, OR or NOT). FIG. 4 shows an example of a tree-like data structure corresponding to the FILTER condition, in which the condition clause is ((attribute A=a) AND (attribute B:$\leq$b)) OR ((attribute C$\geq$c) AND (attribute D is present)).

On the basis of the following algorithm, evaluate_filter, it is possible to produce a program code to test the FILTER condition. The recursive algorithm evaluate_filter goes through the tree-like data structure representing the FILTER condition as from the root, and returns the validity of the FILTER condition as the result. The algorithm tests the entire tree-like data structure except the leaf nodes. The test method for the conditions in the leaf nodes will be described in closer detail below. In the algorithm, the testing of the leaf nodes has been replaced by the operation compare_values. The algorithm does not take into consideration a situation in which the tree-like data structure might be erroneous as to its structure.

The algorithm evaluate_filter can be determined as follows:

```
boolean evaluate_filter (root node) {
auxiliary variables: operator, child node, result;
    if (root node is empty)
        return TRUE;
    if (tree has root node only)
        return compare_values (root node)
    operator := operator included in root node;
    child node := left son of root node;
    if (operator = "NOT")
        result := not evaluate_filter (child node);
    else
        do {
            result = evaluate filter (child node);
            if (child node is not empty)
                child node := right-hand side brother of
                    child node;
        } while (((result = FALSE and operator = "OR")
            or (result = TRUE and operator = "AND")) and
                child node is empty);
    return result;
}
```

The algorithm evaluate_filter indicates that the testing of logical operators in the FILTER condition presents no problems. The problem occurs in the testing of conditions in the leaf nodes of the tree-like data structure representing the FILTER condition, i.e. fulfilling the operation compare_values located in the evaluate_filter algorithm.

The method employed for comparing the attribute values contained in the FILTER condition takes place in two steps, as described above. According to the invention, first semantic trees and a directory for all the home areas of attribute values present in the network element are constructed. The semantic trees and the directory are stored into the network element. Then, the algorithm compare_values, . whose function is based on the interpretation of the stored semantic trees, is applied to the attribute values being compared.

A prerequisite for the implementation of the algorithm compare_values is that the nodes of the semantic tree include the following information: the identifier of the ASN.1 type corresponding to the home area, the identifier of the home area type, the offset for the fields of a record type home area from the beginning of the home area, and the size of the home area. In addition, a directory must exit which the Object Identifier registered to the attribute can be associated with the semantic tree of the home area of the attribute. FIG. 3 illustrates an example of a home area semantic tree.

The principle of the attribute value comparison is illustrated by the algorithm compare_values. The algorithm is presented in a simplified form, and only equivalence comparison is treated in it. For example, the ASN.1 types SET and SET OF are not treated. A person skilled in the art is, however, able to formulate a complete algorithm on the basis of the description disclosed here. The leaf node of the tree-like data structure of FIG. 4 representing the FILTER condition is supplied as an input to the algorithm compare_values. The leaf node contains the Object Identifier of the attribute employed in the comparison, the relational operator and the attribute value employed in the comparison. In the algorithm, it is assumed that the attribute value corresponding to the attribute identifier can be retrieved when the comparison is started. As a result, the algorithm provides information on the success or failure of the attribute value comparison. The algorithm does not take into account any possible error situations. The algorithm compare_values calls a recursive auxiliary algorithm compare_home.

```
Algorithm compare_values:
boolean compare_values (leaf node) {
auxiliary variables:    semantic tree_root,
                        attribute_value;
    semantic tree_root := search_semantic tree_root (
                            leaf node.attribute_identifier);
    attribute value := search_attribute_value (
                            leafnode.attribute_identifier);
    return compare_home (semantic tree_root,
                        attribute_value,
                        leaf node.attribute_reference
                            value);
}
Auxiliary algorithm compare_home:
boolean compare_home (root,
                     attribute_value,
                     attribute_reference value) {
auxiliary variables: child node, result
    if (root.home area_type = pointer type) {
        attribute_value := <interpreting attribute_value
                            as an address, and searching a new
                            value from a location indicated by
                            the address>;
```

-continued

```
        attribute_compare value := <interpreting
                        attribute reference_value as an
                        address, and searching a new value
                        from a location indicated by the
                        address>;
    }
    if (root.ASN1 type = SEQUENCE) {
        child node := left son of root node;
        do {
            result = compare_home (
                        child node,
                        attribute_value+child node.OFFSET,
                        attribute reference_value+child
                        node.
                        OFFSET);
            child node := right brother of child node;
        while (result = TRUE and child node exists);
        return result;
    } else {
        if (root.ASN1-type = BOOLEAN)
                        return compare_boolean (
                        attribute_value,
                        attribute_reference value);
        else
        if (root.ASN1-type = INTEGER)
            return compare_integer (
                        attribute_value,
                        attribute_reference_value);
        ...
    }
}
Auxiliary routine compare_boolean (compare_integer
equals):
boolean compare_boolean (value, reference value)
{
    return value = reference value;
}
```

As disclosed above, the comparison program of the network element reads the identity of the received attribute, reference value and the data type semantic. Following this, the comparison program requests the actual value of the attribute from a separate adaptation program (which contains the information on where the attributes can actually be retrieved, and which is able to return the attribute value as the correct data type) and carries out the comparison. As a result, those object instances are obtained whose attributes matched, and which the operation therefore is applied to.

To clarify the above, the following will examine a practical example with a telephone exchange as the network element. The network element contains a subscriber register, storing information on the subscribers connected to the network element. At the network management interface, the subscriber is represented by the object class "Subscriber", having the attributes "Line number" and "Directory number". The example is imaginary, but the attribute "Directory number" could refer, for example, to the number indicative of the subscriber line during signalling, and the "Line number" could be the identifier of an extension line within the network element. For the attribute "Line number", an ObjectIdentifier {1 2 3} is registered, and for the attribute "Directory number" the identifier {1 2 4}. In ASN.1, the attributes are represented as follows:

Line number ::=INTEGER

Directory number ::=GraphicString

Figure 1:
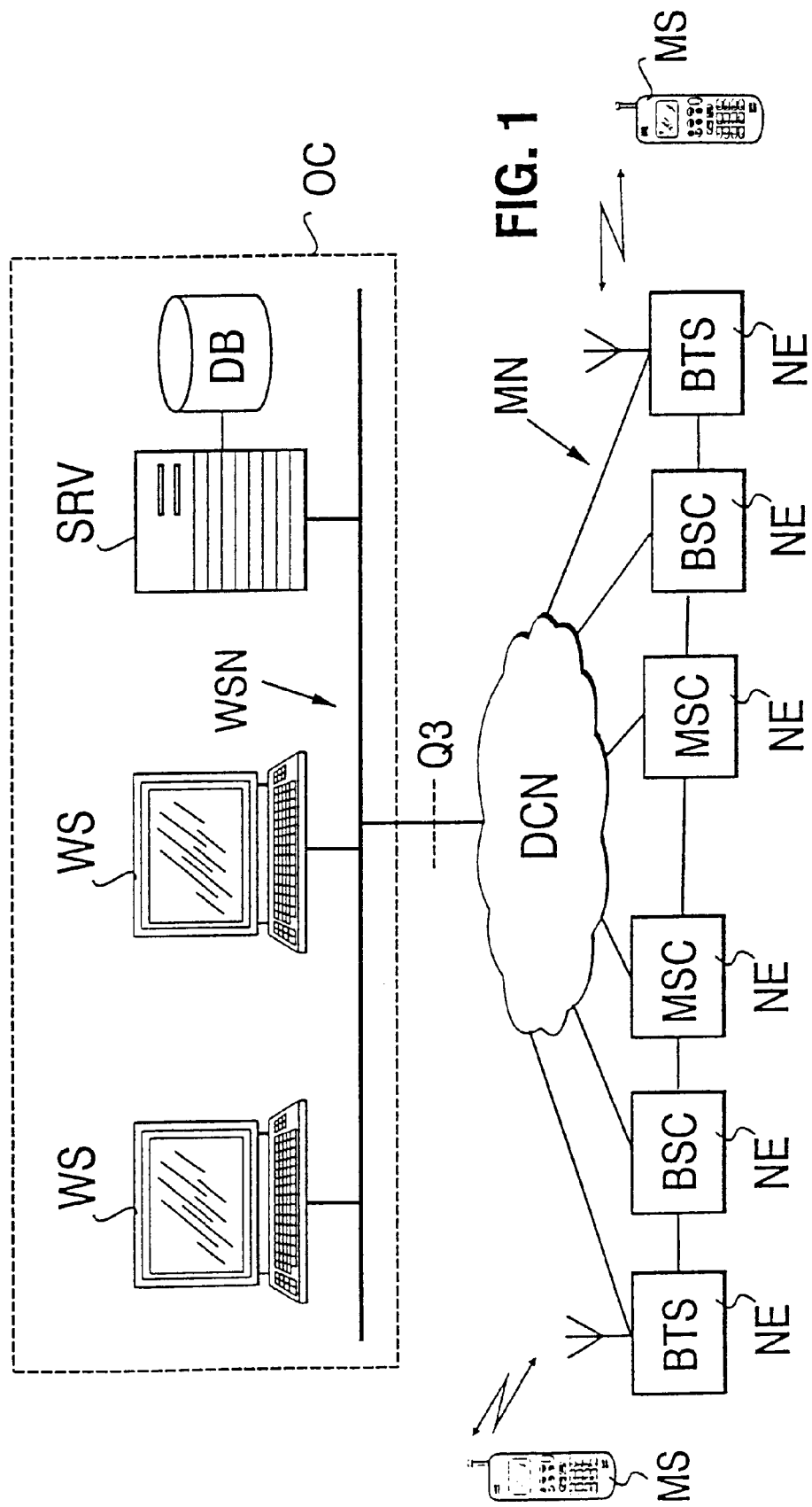
FIG. 1 shows a typical network management system.

By means of an ASN.1 translator, the ASN.1 representations of the attributes can be translated into the following data type representations in C language:

typedef long Line number;

typedef char *Directory number;

It is assumed that the network management workstation (reference mark WS in FIG. 1) wants to find out the subscribers who are connected to the network element, and whose directory number begins with the digit 4 or 5. The network management workstation sends to the network element the following CMIP operation m-Get, which includes the first target group (S) and the FILTER condition, i.e. the comparison criteria of the attributes of the object instances. The group S is determined in the PDU (Protocol Data Unit) of the CMIP protocol, described below by means of the ASN.1 notation, by the value of the baseManagedObjectInstance field, . which indicates the subtree root node in the MIT of the network element, and by the scope value of the field. Fields irrelevant to the example have been left out and replaced by three dots. The FILTER condition is indicated by the value of the filter field. As the root node, the example has an object instance representing the subscriber register. For reasons of clarity, the actual name of the subscriber register instance is in the example replaced by the identifier <Subscriber register>. The value wholeSubtree of the scope field means that the group S contains all the object instances of the subtree, i.e. all the subscribers coupled to the network element. As the value of the filter field there is the ASN.1 expression, which may be described as the expression "the directory number begins with the digit 4, or the directory number begins with the digit 5" in natural language.

```
{
    ...
    baseManagedObjectInstance <Subscriber register>
    ...
    scope wholeSubtree,
    filter or {
        item {
            substrings {
                initialString {
                    attributeId {1 2 4}
                    string "4"
                }
            }
        }
        item {
            substrings {
                initialString{
                    attributeId {1 2 4}
                    string "5"
                }
            }
        }
    },
    ...
}
```

Figure 5:
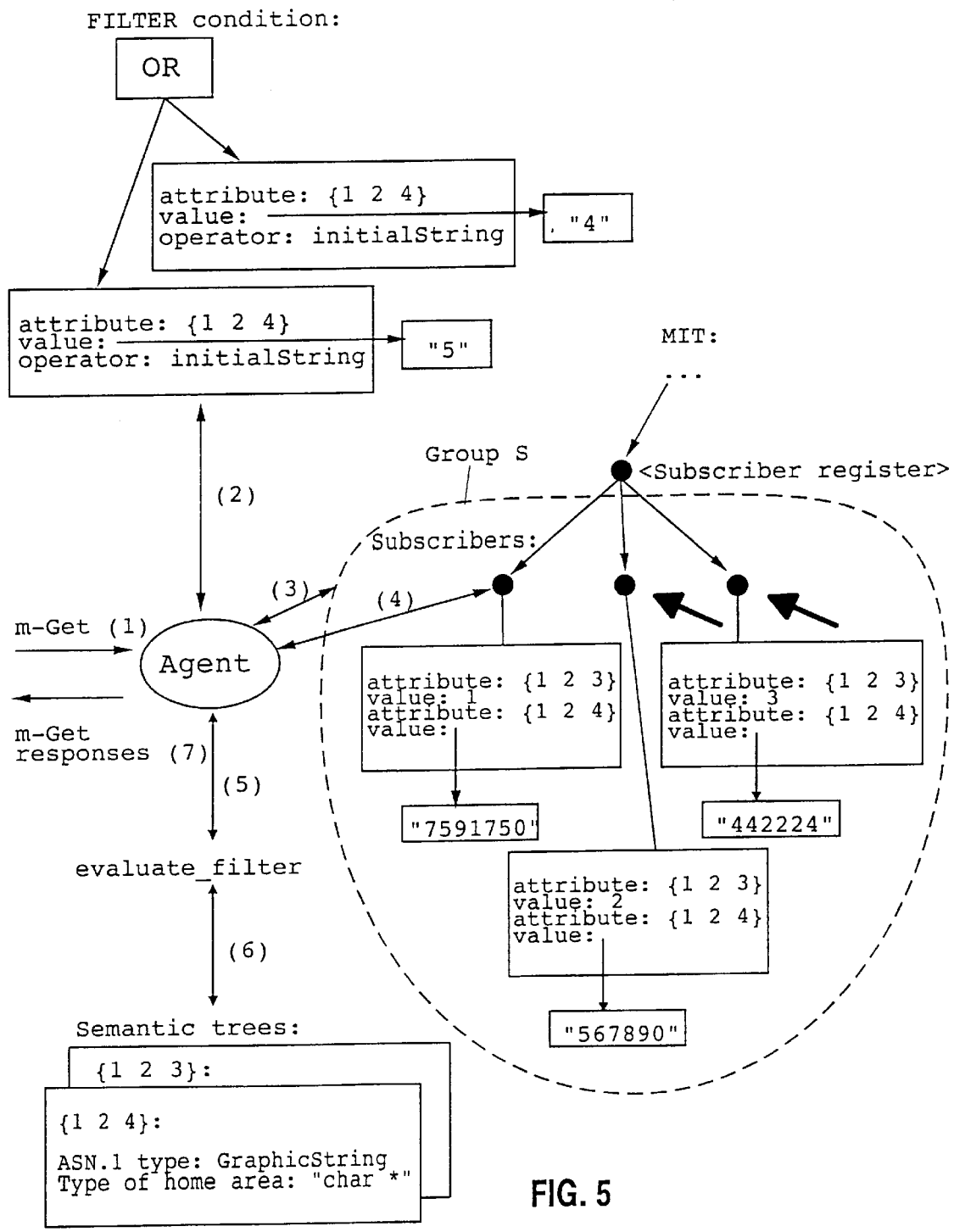
FIG. 5 illustrates the operation of the invention in an exemplary situation in which the network operator searches a group of specific subscribers.

In the following, the numbers in parentheses refer to corresponding numbers in FIG. 5, which illustrates the operation of an agent in the network element. (The numbers, however, do not necessarily refer to the order of execution of the operations) . In the network element, the m-Get operation is received (1) by an agent responsible for the execution of the operation in the network element. The agent organizes the FILTER condition of the m-Get operation into a tree-like configuration (2) . The agent demarcates the group S, which is determined by the m-Get operation, from the object instance tree (i.e., MIT) of the network element (3). In FIG. 5, the group S is demarcated within the MIT by a broken line. The agent processes each object instance belonging to group S separately (4) . The agent finds out whether a specific object instance belongs to the final group of object instances by calling the implementation of the algorithm evaluate_filter described above (5) . on the basis of the attribute identifier {1 2 4} in the FILTER condition, the evaluate_filter retrieves the semantic tree corresponding to the home area of the attribute "Directory number" (6). The markings in the semantic tree in this exemplary case mean that the attribute, whose identifier is {1 2 4}, is Graphic-String as regards its ASN.1 type, and the data type of the home area is "char*" in C language, i.e., a graphic string pointer. Controlled by the information contained in the semantic tree, the evaluate_filter compares the comparison values included in the FILTER condition to the attribute "Directory number" of the object instance by a manner described above. Following this, as the result to the m-Get operation, the agent returns to the network management workstation those subscribers who have the directory numbers "56789" and "442224" (7). These subscribers constitute the final group of target instances. In the MIT of FIG. 5, an arrow points to the subscribers in question.

As noted above, the comparison method which is based on the utilization of semantic trees and used for comparing attribute values is a general-purpose one. The general purpose feature here means that the method is independent of the ASN.1 representations of the attributes. In addition to the advantages described above, the general purpose feature of the method achieves considerable savings concerning network element software development, because the changes in ASN.1 representations or the implementation of new ASN.1 representations will require no additional software development. For the above reason, the implementation of the method can be tested more thoroughly, which improves the reliability of the results of the comparison and of the entire network element.

It is obvious for a person skilled in the art that the various embodiments of the invention are not restricted to the examples above, but may vary within the scope of the attached claims.

I claim:

1. A method for selecting a target group for an operation applied to a network element of a communication network, said method comprising:

receiving, from a network management element, information on said operation and on a first target group, which is indicated as a group of object instances contained in a memory of said network element and as said comparison criteria containing reference values;

comparing said object instance attribute values belonging to said first target group to said reference values; and selecting a final target group from among said object instances in said first target group having attributes fulfilling said comparison criteria, wherein an object instance attribute is compared by
reading semantic data prestored in said network element memory and associated with said object instance attribute,
searching said associated object instance attribute value from said network element, and
comparing said object instance attribute value to said reference value by using said read semantic data.

2. The method as claimed in claim 1, wherein semantic data is stored in said network element memory as a tree-like hierarchical structure.

3. The method as claimed in claim 2, wherein a semantic tree node contains at least (a) an identifier of said object instance attribute valve, and (b) information on what data type to use in said comparison of said object instance.

* * * * *

UNITED STATES PATENT AND TRADEMARK OFFICE
CERTIFICATE OF CORRECTION

PATENT NO.   : 5,941,978
DATED        : August 24, 1999
INVENTOR(S)  : FINNI

It is certified that error appears in the above-identified patent and that said Letters Patent is hereby corrected as shown below:

On the title page, item [73], should read

Assignee:    Nokia Telecommunications Oy, Espoo, Finland

Signed and Sealed this

First Day of February, 2000

Attest:

Q. TODD DICKINSON

*Attesting Officer*    *Acting Commissioner of Patents and Trademarks*